US00RE49013E

(19) United States
(12) Reissued Patent
Villele et al.

(10) Patent Number: US RE49,013 E
(45) Date of Reissued Patent: Apr. 5, 2022

(54) SYSTEMS, METHODS, AND NON-TRANSITORY COMPUTER READABLE MEDIUMS FOR DYNAMIC SELECTION OF ADVANCED APPROACH PROCEDURES

(71) Applicant: HONEYWELL INTERNATIONAL INC., Morris Plains, NJ (US)

(72) Inventors: Dorothee De Villele, Haute-Garonne (FR); Rajesh Chaubey, Karnataka (IN); Daniel Corbel, Haute-Garonne (FR); Marek Batelka, Tisnov (CZ); Pavel Ptacek, Rosice (CZ)

(73) Assignee: HONEYWELL INTERNATIONAL INC., Charlotte, NC (US)

(21) Appl. No.: 16/930,695

(22) Filed: Jul. 16, 2020

Related U.S. Patent Documents

Reissue of:
(64) Patent No.: 10,026,326
Issued: Jul. 17, 2018
Appl. No.: 15/641,525
Filed: Jul. 5, 2017

(51) Int. Cl.
*G08G 5/02* (2006.01)
*B64D 43/00* (2006.01)
(Continued)

(52) U.S. Cl.
CPC ..... *G08G 5/0047* (2013.01); *B64D 43/00* (2013.01); *G01C 21/10* (2013.01); *G01C 23/005* (2013.01);
(Continued)

(58) Field of Classification Search
CPC ..... G01C 23/005; G01C 21/10; B64D 43/00; G08G 5/0047; G08G 5/025; G08G 5/0091; G08G 5/0021; G08G 5/0013
See application file for complete search history.

(56) References Cited

U.S. PATENT DOCUMENTS 7,212,135 B1 * 5/2007 Lynch ..... G08G 5/0065 244/183
8,116,923 B2 * 2/2012 Ishihara ..... G08G 5/025 701/17

(Continued)

*Primary Examiner* — Deandra M Hughes
(74) *Attorney, Agent, or Firm* — Lorenz & Kopf, LLP

(57) ABSTRACT

Systems [and] methods, *and non-transitory computer readable mediums* directed to generating an adaptive glide slope angle and allowing a pilot to interact with the generated glide slope angle are provided. The systems [and] methods, *and non-transitory computer readable mediums* retrieve, from a navigation database (NDB), a designated approach procedure for the aircraft, and identify a designated glide slope angle (D_GSA) based thereon. The systems [and] methods, *and non-transitory computer readable mediums* receive sensed actual weather data and sensed aircraft status data and generate an adaptive glide slope angle A_GSA based thereon. The systems [and] methods, *and non-transitory computer readable mediums* allow modification of and modify, or prevent modification of, the designated approach procedure with the A_GSA based on the determination of whether or not the A_GSA is compatible with the designated approach procedure.

35 Claims, 4 Drawing Sheets

(51) Int. Cl.
*G08G 5/00* (2006.01)
*G01C 21/10* (2006.01)
*G01C 23/00* (2006.01)

(52) U.S. Cl.
CPC ..... *G08G 5/0021* (2013.01); *G08G 5/0091* (2013.01); *G08G 5/025* (2013.01); *G08G 5/0013* (2013.01)

(56) References Cited

U.S. PATENT DOCUMENTS 8,521,340 B2 * 8/2013 Coulmeau ..... G08G 5/0056 340/945
8,660,722 B2 2/2014 Dumoulin et al.
RE45,153 E * 9/2014 Hendrickson ..... G02B 6/4466 385/135
9,469,414 B2 * 10/2016 Meunier ..... G08G 5/02
9,547,312 B2 1/2017 Buisson et al. ..... G08G 5/025
10,026,326 B1 * 7/2018 Villele ..... B64D 43/00
10,388,170 B2 * 8/2019 De Villele ..... G01C 23/00
10,543,932 B2 * 1/2020 Ishihara ..... B64D 45/04
10,600,328 B2 * 3/2020 Villele ..... B64D 45/04
2006/0195235 A1 * 8/2006 Ishihara ..... G01C 23/00 701/16
2006/0253232 A1 * 11/2006 Gerrity ..... G08G 5/0086 701/16
2007/0010921 A1 * 1/2007 Ishihara ..... G08G 5/025 701/16
2013/0218374 A1 * 8/2013 Lacko ..... G08G 5/025 701/16
2016/0090193 A1 * 3/2016 He ..... G08G 5/0021 340/971
2016/0328982 A1 * 11/2016 Jeong ..... B64F 1/18
2017/0032683 A1 * 2/2017 Meserole, Jr. ..... G08G 5/0043
2017/0124886 A1 5/2017 Ishihara et al.
2017/0168658 A1 * 6/2017 Lacko ..... G01C 23/005
2017/0301247 A1 * 10/2017 Sherry ..... G06N 7/005

* cited by examiner

SYSTEMS, METHODS, AND NON-TRANSITORY COMPUTER READABLE MEDIUMS FOR DYNAMIC SELECTION OF ADVANCED APPROACH PROCEDURES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

The technical field generally relates to aircraft guidance systems, and more particularly relates to systems and related operating methods for dynamic selection of advanced approach procedures.

BACKGROUND

The phase of flight prior to landing an aircraft is referred to as "approach," or an approach procedure. Conventionally, each runway or landing area has for it a designated approach procedure, which is a pre-published set of maneuvers that a pilot follows. The designated approach procedure includes a designated glide slope angle for an aircraft to follow in its final approach segment.

In order to increase capacity at airports, advanced approach procedures that increase the published glide slope angle are often desirable. An increased glide slope angle may also provide the benefit of reducing an impact on the environment (noise and emissions) over conventional approach systems. However, the glide slope angle cannot automatically be increased in all cases because conditions may exist around the landing destination or aircraft that would restrict such an increase. Therefore, advanced approach procedures capable of generating, in real time, a safe adaptation to the published glide slope angle and allowing a pilot to interactively choose it are desirable. The following disclosure provides these technological enhancements over systems employing conventional approach procedures, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Provided is a method to be carried out by an onboard system of an aircraft, the onboard system including a display device and a user interface. The method comprising: in a control module, receiving, via the user interface, a selection of a designated approach procedure in a flight plan; retrieving, from a navigation database (NDB), the designated approach procedure; identifying a designated glide slope angle (D_GSA) based on the designated approach procedure; determining an adaptive glide slope angle (A_GSA) based on data from an on-board sensor system; determining whether or not the A_GSA is compatible with the designated approach procedure; displaying the D_GSA and A_GSA on the display device, enabling the pilot to utilize the user interface to modify the designated approach procedure with the A_GSA, when the designated approach procedure is compatible with the A_GSA; and barring modification of the designated approach procedure with the A_GSA, and generating a first alert, when the A_GSA is not compatible with the designated approach procedure, and allowing modification of the designated approach procedure with the A_GSA when the A_GSA is compatible with the designated approach procedure.

Also provided is a system for an approach procedure for an aircraft, the system comprising: a display system; a control module coupled to the display system, the control module comprising a processor and a memory device, the control module configured to: receive, from a user interface, a user selected designated approach procedure for the aircraft; retrieve, from a navigation database (NDB), the designated approach procedure; identify a designated glide slope angle (D_GSA) based on the designated approach procedure; receive sensed data from an on-board sensor system; determine an adaptive glide slope angle (A_GSA) based the sensed data; process the A_GSA with the designated approach procedure to determine whether or not the A_GSA is compatible with the designated approach procedure; and command the display device to render a user interface comprising a plurality of icons, the plurality of icons comprising, a first icon indicating the D_GSA, a second icon indicating the A_GSA, and a third icon indicating whether or not the A_GSA is compatible with the designated approach procedure.

Another method for an approach procedure for an aircraft is provided. The method comprising: at a control module: receiving a user designated approach procedure, altitude constraints, and landing parameters; retrieving, from a navigation database (NDB) the designated approach procedure; identifying a designated glide slope angle (D_GSA) based on the designated approach procedure; receiving sensed weather data and sensed aircraft status data from an on-board sensor system; determining an adaptive glide slope angle (A_GSA) based the sensed weather data and the sensed aircraft status data; processing the A_GSA with the designated approach procedure to determine whether or not the A_GSA is compatible with the designated approach procedure; and commanding a display device to render a user interface comprising a plurality of icons, the plurality of icons comprising, a first icon indicating the D_GSA, a second icon indicating the A_GSA, and a third icon indicating whether or not the A_GSA is compatible with the designated approach procedure.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, brief summary, or the following detailed description.

As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality. The provided system and method may take the form of a control module, and may be separate from, or integrated within, a preexisting mobile platform management system or aircraft flight management system (FMS).

As an overview, the disclosed control module processes current actual weather data and current aircraft conditions to generate an adaptive glide slope angle, which may be a slight angular change to the published glide slope angle. The control module retrieves a designated glide slope angle, as well as other relevant constraints around the airport or landing area, such as altitude and terrain constraints. The control module executes novel rules encoded in memory to determine whether the adaptive glide slope angle is compatible with the designated approach procedure. Responsive the determination of compatibility, the control module either allows modification of the designated approach procedure in accordance with the adaptive glide slope angle, or generates an alert and bars or does not allow the designated glide slope angle to be modified. Although the depicted control module is generally realized within an aircraft, for example, as part of a flight management system, the concepts presented here can be adapted to a variety of mobile platforms, such as vehicles, spacecraft, watercraft, and the like. The figures and descriptions below provide more detail.

Figure 1:
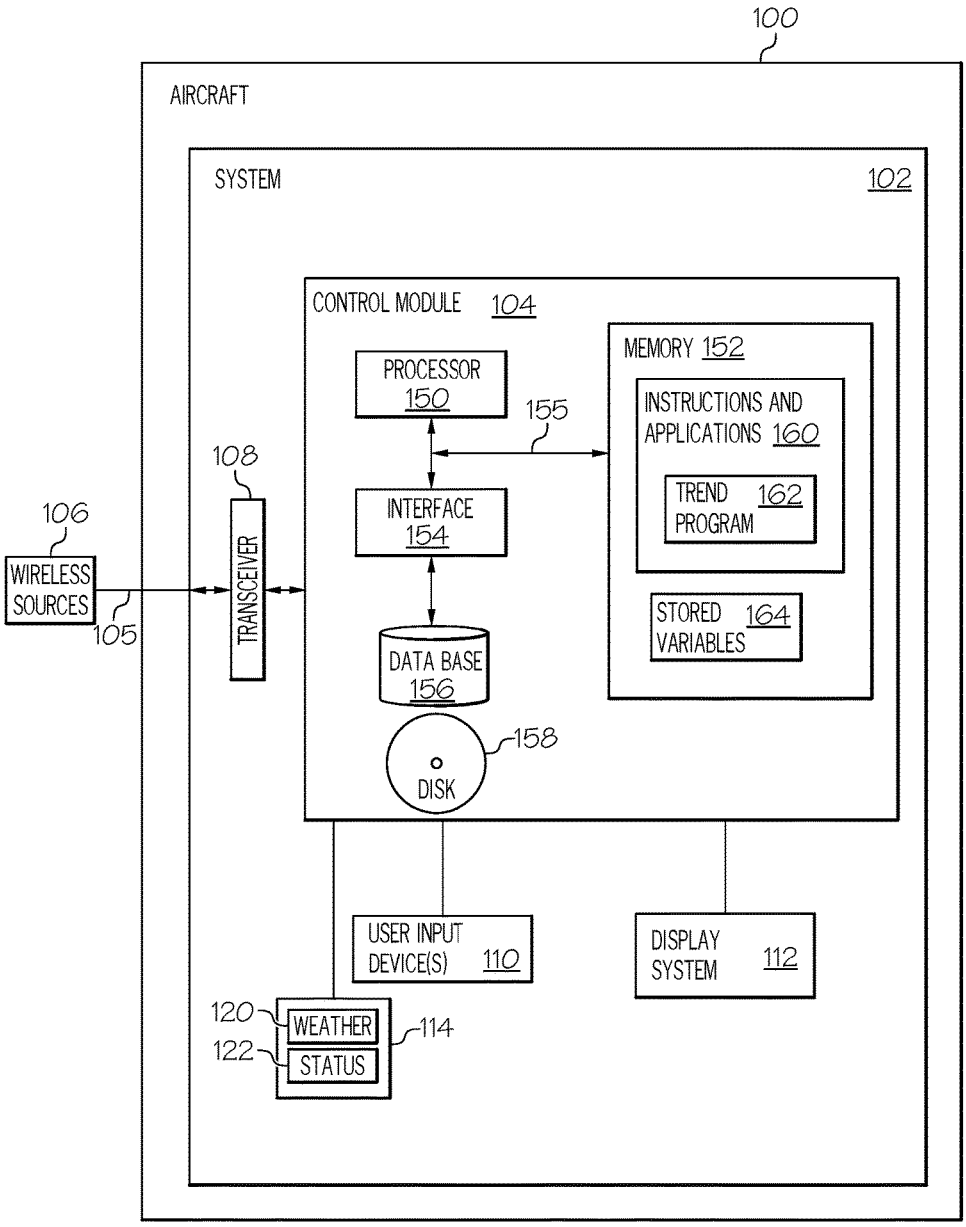
FIG. 1 is a functional block diagram illustrating an adaptive interactive glide slope angle system, in accordance with various exemplary embodiments.

Turning now to FIG. 1, a functional block diagram of an aircraft 100 with an adaptive interactive glide slope angle system (AIGSA system 102) is depicted, in accordance with various exemplary embodiments. In the depicted embodiment, the AIGSA system 102 includes: a control module 104, operationally coupled to a transceiver 108, a user input device 110, a display system 112, and an on-board sensor system 114. The AIGSA system 102 also receives wireless signals 105, comprising traffic data, air traffic control (ATC) commands, weather reports, and etc.

In various embodiments, wireless signals 105 may comprise wireless signals from a variety of different combinations of wireless sources 106. Wireless sources 106 may comprise any combination of, a datalink and air traffic control (ATC) system, an electronic flight bag (EFB)/electronic ground proximity warning system (EGPWS), a traffic collision and avoidance system (TCAS), a weather information system, and other systems as conventionally known to persons of skill in the art.

The transceiver 108 enables the control module 104 to establish and maintain the communications links between the control module 104, other onboard components, and the wireless sources 106. The transceiver 108 may include at least one receiver and at least one transmitter that are operatively coupled to the control module 104. The transceiver 108 can support wired and a variety of types of wireless communication, and can perform signal processing (e.g., digitizing, data encoding, modulation, etc.) as is known in the art. In some embodiments, the transceiver 108 is integrated with the control module 104.

In various embodiments, the user input device 110 may include any one, or combination, of various known user input device devices including, but not limited to: a touch sensitive screen; a cursor control device (CCD) (not shown), such as a mouse, a trackball, or joystick; a keyboard; one or more buttons, switches, or knobs; a voice input system; and a gesture recognition system. Non-limiting examples of uses for the user input device 110 include: entering values for stored variables 164, loading or updating instructions and applications 160, and loading and updating the contents of the database 156, each described in more detail below. Users may enter data and information such as, selection of a designated approach procedure, flight plan, and landing parameters via the user input device 110.

The display system 112 may be implemented using any one of numerous known display devices suitable for rendering textual, graphic, and/or iconic information in a format viewable by a user. The display devices may provide three dimensional or two dimensional images, and may provide synthetic vision imaging. Non-limiting examples of such display devices include cathode ray tube (CRT) displays, and flat panel displays such as LCD (liquid crystal displays) and TFT (thin film transistor) displays. Accordingly, each display device responds to a communication protocol that is either two- or three-dimensional, and may support the overlay of text, alphanumeric information, or visual symbology. The display device(s) in the display system 112 may each, individually, be responsive to user input via user input device(s) 110 and/or be under the control of the control module 104. In various embodiments, such as touch screen display systems, the display system 112 and the user input device 110 are integrated.

The on-board sensor system 114 may comprise any combination of sensing devices. The on-board sensor system 114 comprises weather sensors 120 that provide "actual weather" which is current, or real-time, sensed weather data, such as temperature, wind velocity and direction, humidity, precipitation, etc. The on-board sensor system 114 also comprises aircraft system and subsystem status sensors 122 (which includes sensors and means for detecting fuel level, engine temperature, aircraft type and weight class, engine thrust, the status of brakes, and the like). Specifically, the aircraft system and subsystem status sensors 122 also comprise a geographic positioning system (GPS). The on-board sensor system 114 may further comprise a means for converting the various sensed temperatures, pressures, conductivities, and the like, into electrical signals for processing by the control module 104.

Referring again to FIG. 1, within the AIGSA system 102, the control module 104 performs the functions of the AIGSA system 102. The control module 104 comprises a processor 150 and a memory 152. The control module 104 also includes an interface 154, communicatively coupled to the processor 150 and the memory 152 (via a bus 155), a database 156, and an optional storage disk 158. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals.

In operation, the processor 150 may utilize one or more computer readable storage media, such as a memory 152, the database 156, and a disk 158 for storage and a scratch pad. The memory locations where data bits are maintained in computer readable storage media are physical locations that have particular electrical, magnetic, optical, or organic, properties corresponding to the data bits. The memory 152 can be any type of suitable computer readable storage medium. For example, the memory 152 may include various types of dynamic random access memory (DRAM) such as SDRAM, the various types of static RAM (SRAM), and the various types of non-volatile memory (PROM, EPROM, and flash). In certain examples, the memory 152 is located on and/or co-located on the same computer chip as the processor 150. In the depicted embodiment, the memory 152 stores the above-referenced instructions and applications 160 along with one or more configurable variables in stored variables 164.

The database 156 is a computer readable storage medium in the form of any suitable type of storage apparatus, including direct access storage devices such as hard disk drives, flash systems, floppy disk drives and optical disk drives. As used herein, the database 156 comprises a navigation database (NDB) as known in the art. Information in the databases 156 may be preloaded, and/or organized or imported during an initialization step (for example, at 602 of the method 600 in FIG. 6).

The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies. During operation, the AIGSA program 162, stored in the memory 152, is loaded and executed by the processor 150.

The interface 154 enables communications within the Control module 104, can include one or more network interfaces to communicate with other systems or components, and can be implemented using any suitable method and apparatus. For example, the interface 154 enables communication from a system driver and/or another computer system. In one embodiment, the interface 154 obtains the various wireless signals 105 from wireless source 106 directly. The interface 154 may also include one or more network interfaces to communicate with technicians, and/or one or more storage interfaces to connect to storage apparatuses, such as the database 156.

During operation, the processor 150 loads and executes one or more programs, algorithms and rules embodied as instructions and applications 160 contained within the memory 152 and, as such, controls the general operation of the AIGSA system 102. Accordingly, the processor 150 is configured to process received inputs (any combination of: the user input provided via the user input device 110, wireless signals 105 from wireless sources 106, and sensed information from the on-board sensor system 114), reference the database 156 in accordance with the AIGSA program 162, and command and control the display system 112 based thereon.

With specific focus on approach procedures, the processor 150 and the memory 152 of the control module 104 form an adaptive glideslope engine that performs the processing activities. The adaptive glideslope engine provides a technological improvement to the conventional display of, and control over, glideslope angle implementation, in part, by determining an adaptive glide slope angle and enabling a dynamic selection of the adaptive glide slope angle. The control module 104 thereby realizes an unconventional technological improvement to conventional continuous descent operations, such as approach procedures. The adaptive glideslope engine performs the processing activities, such as the method 600 of FIG. 6, in accordance with the AIGSA program 162, as is described in more detail below.

It will be appreciated that AIGSA system 102 may differ from the embodiment depicted in FIG. 1. As a first example, in various embodiments, any combination of the user input device 110, the transceiver 108, and the display system 112 can be integrated, for example, as part of an existing FMS or cockpit display in an aircraft. In another example, the on-board sensor system 114 may be dis-integrated, and comprise multiple sensor systems distributed around the aircraft and interacting individually with the control module 104. Regardless of the state of integration of these systems, a user may control one or more features of the AIGSA system 102 by providing user input via at least the user input device 110.

Figure 2:
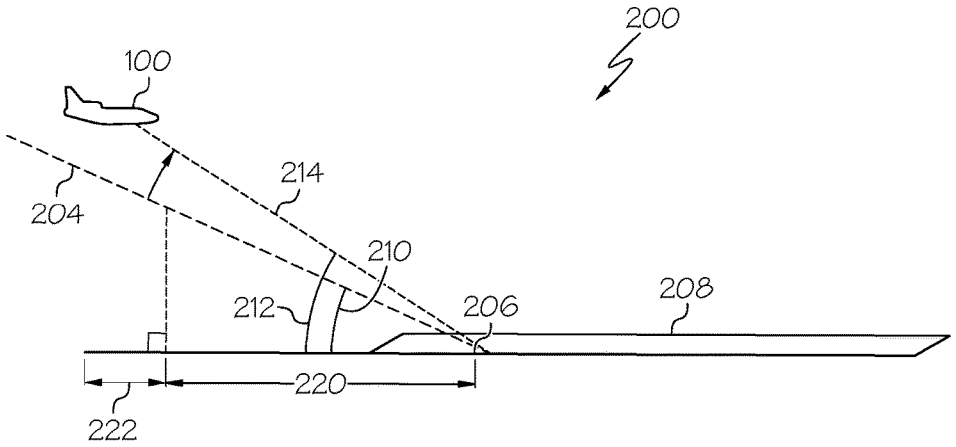
FIG. 2 is an illustration of a generated adaptive glide slope angle, in accordance with various exemplary embodiments.
Figure 3:
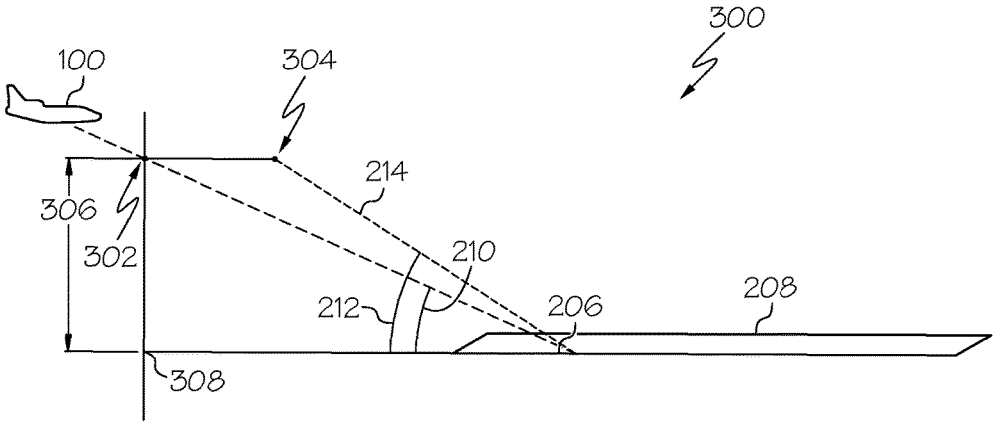
FIG. 3 is an illustration showing a level segment introduced by a generated adaptive glide slope angle, in accordance with various exemplary embodiments.

Turning now to FIG. 2 and FIG. 3, some relevant measurements and features are depicted and described. Aircraft 100 is in its final approach segment, following a designated approach procedure on a path 204 to an intersection point 206 on a landing threshold of a runway 208. It is understood that the landing threshold may extend perpendicularly across a width of the runway 208, and the intersection point 206 is a generalized spot on the landing threshold at which the aircraft 100 will first make contact with the runway 208. The designated approach procedure has a designated glide slope angle D_GSA 210. As mentioned, the control module 104 processes data from the on-board sensor system 114 (sensed actual/current weather data from weather sensors 120 and sensed current aircraft status data from status sensors 122), and generates an adaptive glide slope angle A_GSA 212 based thereon. In operation, taking advantage of the A_GSA 212 means moving the aircraft 100 from its path 204 to path 214, which is visibly steeper (i.e., the rise over run is larger) than path 204. Path 214 is also heading toward the intersection point 206 on the landing threshold of the runway 208. In various embodiments, A_GSA is less than or equal to plus 3.5 degrees of the D_GSA.

After determining the A_GSA 212, the control module 104 determines whether or not the A_GSA is compatible with the designated approach procedure before making the A_GSA an available and selectable option for the pilot. In various embodiments, a determination that the A_GSA is not compatible with the designated approach procedure comprises determining that one or more conditions are violated (conditions are described below). Also, in various embodiments, the results of the determination of whether the A_GSA is compatible with the designated approach procedure may be communicated to air traffic control (ATC) for use in descent planning. If one or more of the conditions is violated, the control module 104 does not allow modification of the final approach segment (i.e., it may not be changed from 204 to 214).

In a first example condition, the control module 104 does not allow modification of the designated approach procedure with the A_GSA if the position and location of the aircraft 100 at the time of the determination violates (is less than or equal to) a predetermined distance 220 from the landing threshold. Said differently, the aircraft is too close to the landing threshold to make the change. If the position and location of the aircraft 100 at the time of the determination greater than the predetermined distance 220 from the landing threshold, the predetermined distance is not violated. Arrow 222 indicates the region in which the aircraft 100 position and location at the time of the determination is greater than a predetermined distance 220 from the landing threshold, i.e. the aircraft is not in violation of the predetermined distance 220 and modification of the designated approach procedure with the A_GSA is allowed.

In another example condition, the position and location of the aircraft 100, in addition to its ground speed, is processed. In this example, determining that the A_GSA is not compatible with the designated approach procedure comprises determining that an amount of time before landing based on the aircraft position, location, and ground speed, is less than a predetermined amount of time before landing. Similar to the above, this means that there is just not enough time to enact the change before landing. The aforementioned predetermined distance and predetermined amount of time may be configurable variables that are predetermined and stored in stored variables 164, or they may be based on the designated approach procedure.

A third condition involves an altitude constraint. When the aircraft changes its flight path from path 204 to path 214, the flight profile may look something like the illustration 300 of FIG. 3. A lateral segment is introduced as aircraft 100 flies from a point 302 to point 304, from which point it may take path 214 to the runway 208. The lateral segment from point 302 to point 304 is at altitude 306 above ground. In some scenarios, such as continuous descent operations, final approach segment altitude constraints do not permit lateral segments. For example, altitude constraints or restrictions may be in place at location 308 or at altitude 306. The control module 104 may find final approach segment altitude constraints in the NDB in database 156. When an existing altitude constraint does not permit the lateral segment from 302 to 304, the control module 104 does not allow use of the generated A_GSA.

In various embodiments, upon determining that that the A_GSA is not compatible with the designated approach procedure, the control module 104 does not allow modification of the designated approach procedure with the A_GSA. In addition, the control module 104 may also generate an alert. The alert may be a rendered on an image or interactive user interface on the display system 112, and may employ any of various known visually distinguishing techniques, such as text changes, color changes, highlighting, blinking, and the like.

Figure 4:
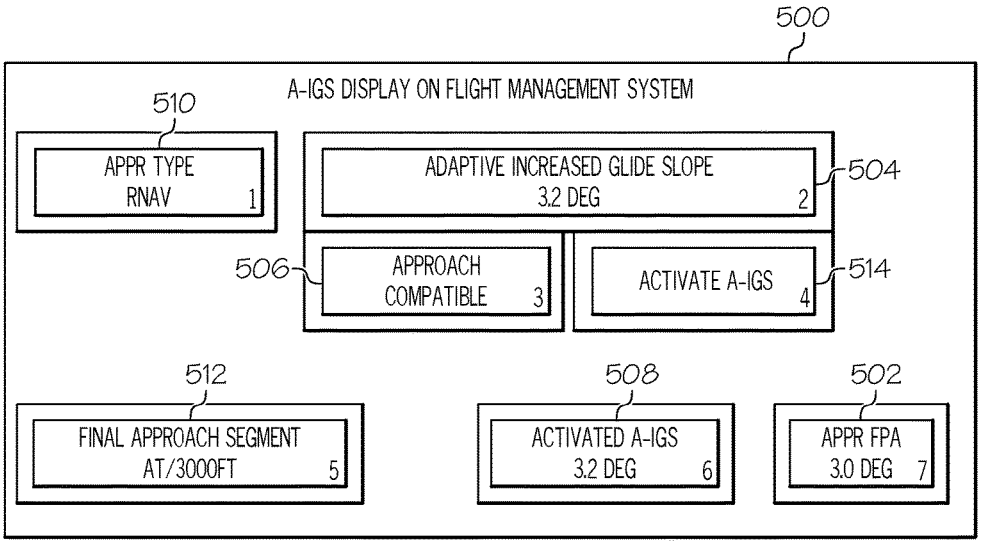
FIG. 4 is a display image for a user interface illustrating an adaptive glide slope angle being determined as compatible with a final approach, in accordance with various exemplary embodiments.
Figure 5:
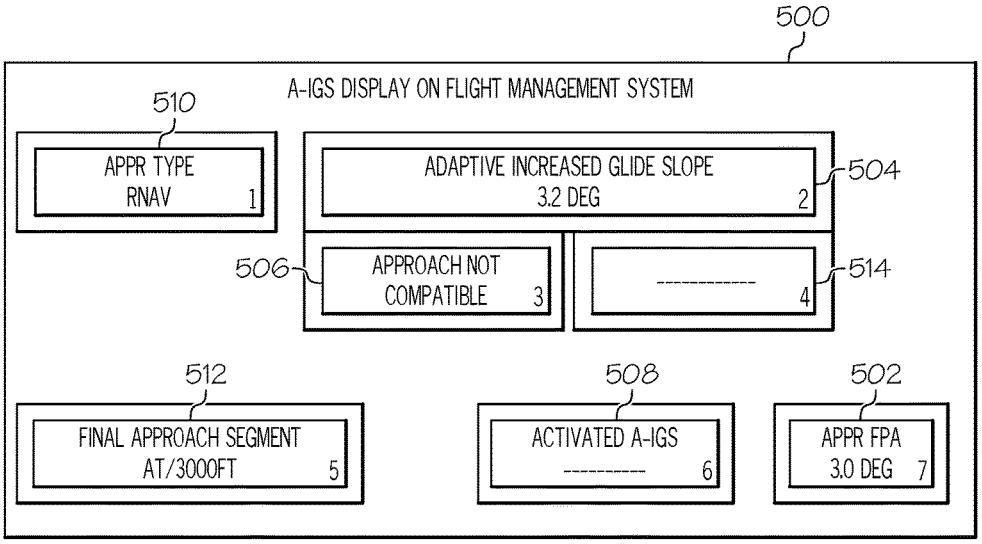
FIG. 5 is a display image for a user interface illustrating an adaptive glide slope angle being determined as incompatible with a final approach, in accordance with various exemplary embodiments.

A non-limiting example of an interactive user interface that may be rendered on the display system 112 is depicted in FIGS. 4 and 5. The exemplary user interface has a plurality of icons arranged in a pattern to facilitate intuitive interaction with the AIGSA system 102. The plurality of icons comprises a first icon 502 indicating the D_GSA with a respective value (3 degrees in FIG. 4 and FIG. 5); a second icon 504 indicating the A_GSA and a respective value (3.2 degrees in FIG. 4 and FIG. 5); a third icon 506 indicating whether or not the A_GSA is compatible with the designated approach procedure; a fourth icon (508) indicating whether or not the AIGSA system 102 is activated; a fifth icon (510) indicating an approach type, a sixth icon (512) indicating the final approach segment altitude constraint, and a seventh icon (514) providing an option to activate the A_GSA system 102. The approach type and the final approach segment altitude constraint may be received ahead of time and stored in memory 152, or may be based on processing the designated approach procedure.

On comparison of FIG. 4 and FIG. 5, it is observable that in FIG. 4, the A_GSA is compatible with the approach procedure (FIG. 4, 506), whereas in FIG. 5, it is not (FIG. 5, 506). Accordingly, the option to activate the AIGSA system 102 (seventh icon 514) is available in FIG. 4 and fourth icon 508 indicates with text that it has been activated, whereas in FIG. 5, the seventh icon (514) indicates with a lack of text (dashes) that there's no option to activate the AIGSA system 102, and the fourth icon (508) shows that the AIGSA system 102 is not activated. Further, it is understood that the control module 104 receives user input to activate the AIGSA system 102 subsequent to indicating that the option to activate the AIGSA system 102 is allowed, and the control module 104 receives user input to modify the designated approach procedure with the A_GSA subsequent to indicating that the option to modify the designated approach procedure with the A_GSA is allowed. In each case, the control module 104 capably determines that the user input has been received subsequent to the respective prompt, such as the icon indicating that the A_GSA is compatible with the approach procedure (third icon 506).

Figure 6:
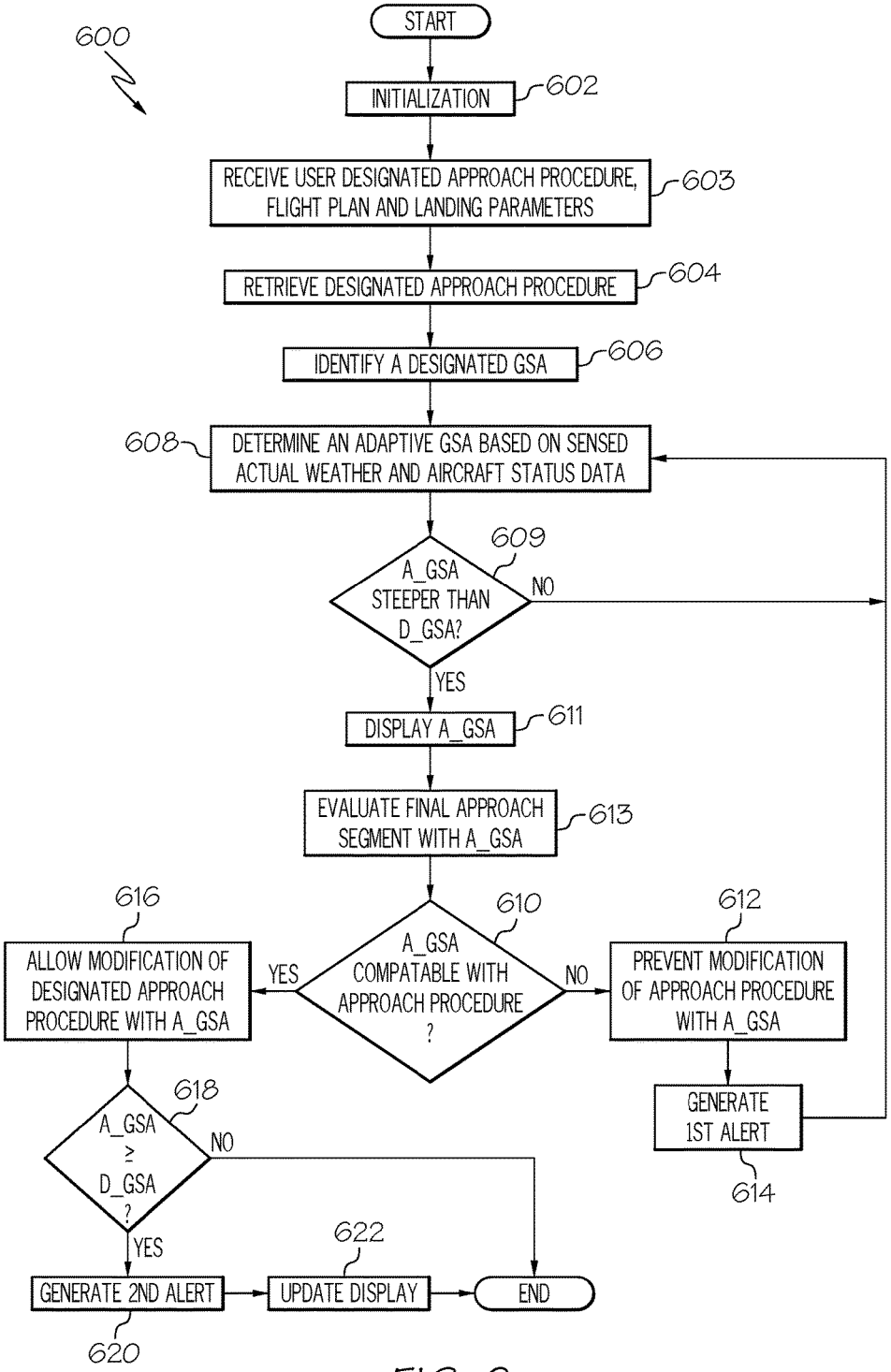
FIG. 6 is a flow chart describing a method for providing an adaptive interactive glide slope angle, in accordance with various exemplary embodiments.

As mentioned, the processor 150 and the AIGSA program 162 form an adaptive interactive glide slope angle (AIGSA) engine that continually, and in real time, generates the A_GSA, and processes the sensed data from the sensor system 114 in accordance with a set of rules encoded in the AIGSA program 162. Referring now to FIG. 6 and with continued reference to FIGS. 1-5, a flow chart is provided for a method 600 for providing an AIGSA, in accordance with various exemplary embodiments. Method 600 represents various embodiments of a method associated for providing an interactive adaptive glide slope angle. For illustrative purposes, the following description of method 600 may refer to elements mentioned above in connection with FIG. 1. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 as long as the intended overall functionality remains intact.

The method starts, and at 602 the control module 104 is initialized. As mentioned above, initialization may comprise uploading or updating instructions and applications 160, AIGSA program 162, stored variables 164, and the various lookup tables stored in the database 156. Predetermined variables may include, for example, predetermined distances and times to use as thresholds, parameters for setting up a user interface that is displayed (for example 500), and the various shapes, various colors and/or visually distinguishing techniques used for icons and alerts. In an embodiment, at 602, the method 600 initializes navigational map data in the database 156. In some embodiments, AIGSA program 162 includes additional instructions and rules for rendering information differently based on type of display device in display system 112. Initialization at 602 may also include identifying wireless sources 106 and/or wireless signals 105.

At 603 user designations or selections are received. The user may designate one or more of: an approach procedure, flight plan, altitude constraints, and landing parameters. At 604 the designated approach procedure is retrieved from the NDB (database 156), based on the user selections. The designated approach procedure is generally airport or landing area specific, and may comprise additional constraints, such as altitude constraints and/or ground distance constraints and flight constraints around obstacles or environmental features. At 606, a glide slope angle associated with the designated approach procedure is identified. This glide slope angle is referred to as a designated glide slope angle D_GSA 210, and is the default glide slope angle unless and until modified later. At 608 sensed data from an on-board sensor system 114 is processed by the control module 104, and an adaptive glide slope angle A_GSA is determined therefrom The sensed data may include sensed actual weather data from weather sensors 120, and sensed aircraft status data from status sensors 122. The sensed aircraft status data may comprise static status data, such as an aircraft identification and weight class, as well as dynamic status data, such as fuel levels, engine temperatures, aircraft ground speed, aircraft position and location, dynamically calculated aircraft weight based on, for example, fuel consumption, aircraft altitude, and the like. At any time, the aircraft ground speed and position and location may be processed to determine a descent rate.

At 609, the method determines whether the A_GSA is steeper than the D_GSA. Typically, the A_GSA is between three and three and a half degrees steeper than the D_GSA. If it is steeper, at 611, the A_GSA is displayed on the display system 112. At 613, the method evaluates the final approach segment with A_GSA.

At 610, the method 600 determines whether or not the generated A_GSA is compatible with the existing approach procedure. The determination at 610 may comprise comparing various sensed data to information provided in the designated approach procedure. As mentioned above, the violation of conditions such as altitude constraints, distance to landing and time to landing are determined in the process of determining whether or not the generated A_GSA is compatible with the existing approach procedure. Performing these condition checks increase safety and confidence in modifying the designated approach procedure. Upon determining that the A_GSA is compatible with the designated approach procedure at 610, the method proceeds to allowing modification of the designated approach procedure with the A_GSA at 616. 616 may include prompting a user (with a rendering on the display system 112) that the approach is compatible, further prompting the user to activate the A_GSA system, and further displaying when the A_GSA system is activated. When the user then selects modification of the designated approach procedure eith the A_GSA, the method generates an aircraft descent trajectory using the A_GSA. At 622, the display system 112 updates displayed images to reflect the user selections and modifications.

At 612, when it is determined that the generated A_GSA is not compatible with the existing approach procedure, the method 600 may prevent modification of the approach procedure with the A_GSA. Referring again to FIG. 5, in various embodiments, the A_GSA that has been calculated may be on display on the user interface (see icon 504), however, the option to activate the AIGSA system to utilize the A_GSA may be prevented (see icon 514). In various embodiments, the manner in which the fact that it is prevented, or disallowed from use, is indicated may involve one or more techniques for visually distinguishing the fourth icon (see FIG. 6, icon 514 in which it uses dashes). In other embodiments, the method may include displaying text stating that the option is not available. Accordingly at 612, the glide slope angle used is restricted to the published D_GSA (see FIG. 6, icon 502). At 612, or in a separate method step, such as at 614, a first alert may be generated to draw the pilot's attention to the incompatibility of the A_GSA with the designated approach procedure.

In addition to the above checks of conditions, at 618 various embodiments may further compare D_GSA to the A_GSA, and if the D_GSA is greater than or equal to the A_GSA, a second alert may be generated at 620. The second alert is rendered in a manner that is visually distinct from the first alert. The reason for the second alert is to draw the pilot's attention to the fact that, upon comparing actual weather conditions and actual aircraft status, a more gradual glide slope angle is recommended (A_GSA being smaller than D_GSA). From 614, the process may return to 608 and determine another A_GSA. After 622, the method 600 may end. Transitioning away from an alert such as at 620 or at 614 may be conditioned upon receiving a user acknowledgment, and the user acknowledgment may trigger the deasserting of the second alert, and in some cases, also the first alert.

As is readily appreciated, the above examples of the adaptive interactive glide slope angle system (AIGSA system 102) are non-limiting, and many others may be addressed by the control module 104. Thus, systems and methods directed to improvements in the presentation and use of glide slope angles during approach over conventional guidance systems are provided.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims. It will also be appreciated that while the depicted exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program 162 and containing computer instructions stored therein for causing a computer processor (such as the processor 150) to perform and execute the program 162. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

What is claimed is:

1. A method to be carried out by an onboard system of an aircraft, the onboard system including a display device and a user input device, the method comprising:

in a control module, receiving, via the user input device, a selection of a designated approach procedure in a flight plan;

retrieving, from a navigation database (NDB), the designated approach procedure;

identifying a designated glide slope angle (D_GSA) based on the designated approach procedure;

determining an adaptive glide slope angle (A_GSA) based on data from an on-board sensor system;

determining whether or not the A_GSA is compatible with the designated approach procedure;

[displaying the D_GSA and A_GSA on the display device,] *commanding the display device to render a user interface comprising a plurality of icons, the plurality of icons comprising:*

*a first icon indicating the D_GSA,*

*a second icon indicating the A_GSA, and*

*a third icon indicating whether or not the A_GSA is compatible with the designated approach procedure;* enabling [the] *a* pilot *of the aircraft* to [utilize the user input device to] modify the designated approach procedure with the A_GSA, when the designated approach procedure is compatible with the A_GSA; and barring modification of the designated approach procedure with the A_GSA, and generating a first alert, when the A_GSA is not compatible with the designated approach procedure, and allowing modification of the designated approach procedure with the A_GSA when the A_GSA is compatible with the designated approach procedure.

2. The method of claim 1, wherein determining that the A_GSA is not compatible with the designated approach procedure comprises determining that employing the A_GSA violates a final approach segment altitude constraint.

3. The method of claim 1, wherein the data from the on-board sensor system comprises an aircraft position and location, and wherein determining that the A_GSA is not compatible with the designated approach procedure comprises determining that the aircraft position and location violates a predetermined distance from a landing threshold.

4. The method of claim 1, wherein the data from the on-board sensor system comprises an aircraft ground speed, and wherein determining that the A_GSA is not compatible with the designated approach procedure further comprises determining that an amount of time before landing based on the aircraft position, location, and ground speed, is less than a predetermined amount of time before landing.

5. The method of claim 1, wherein the data from the on-board sensor system comprises an aircraft position, location, and ground speed, and wherein determining that the A_GSA is not compatible with the designated approach procedure comprises determining that (i) that the aircraft position and location violates a predetermined distance from a landing threshold, or (ii) an amount of time before landing based on the aircraft position, location, and ground speed, is less than a predetermined amount of time before landing.

6. The method of claim 5, wherein allowing modification of the designated approach procedure further comprises determining that the D_GSA is greater than or equal to the A_GSA and generating a second alert.

7. The method of claim 5, further comprising:

subsequent to determining that the A_GSA is compatible with the designated approach procedure, modifying the designated approach procedure with the A_GSA responsive to receiving a user selection to modify the designated approach procedure with the A_GSA.

8. The method of claim [7] *1, wherein the plurality of icons* further [comprising:] *comprises*

[commanding a display system to render a user interface comprising a plurality of icons, the plurality of icons comprising, a first icon indicating the D_GSA, a second icon indicating the A_GSA, a third icon indicating whether or not the A_GSA is compatible with the designated approach procedure, and]

a fourth icon indicating whether or not an adaptive interactive glide slope angle (AIGSA) system is activated.

9. The method of claim 7, wherein the plurality of icons further comprises a fifth icon indicating an approach type, a sixth icon indicating the final approach segment altitude constraint, and a seventh icon indicating whether or not the AIGSA system is activated.

10. A system for an approach procedure for an aircraft, the system comprising:

a display system;

a control module coupled to the display system, the control module comprising a processor and a memory device, the control module configured to:

receive, from a user input device, a user selected designated approach procedure for the aircraft;

retrieve, from a navigation database (NDB), the designated approach procedure;

identify a designated glide slope angle (D_GSA) based on the designated approach procedure;

receive sensed data from an on-board sensor system;

identifying an adaptive glide slope angle (A_GSA) based *on* the sensed data;

process the A_GSA with the designated approach procedure to determine whether or not the A_GSA is compatible with the designated approach procedure; and command the display device to render a user interface comprising a plurality of icons, the plurality of icons comprising, a first icon indicating the D_GSA, a second icon indicating the A_GSA, and a third icon indicating whether or not the A_GSA is compatible with the designated approach procedure.

11. The system of claim 10, wherein the control module is further configured to:

upon determining that the A_GSA is not compatible with the designated approach procedure, generate a first alert and prevent modification of the designated approach procedure with the A_GSA.

12. The system of claim 11, wherein the control module is further configured to:

upon determining that the A_GSA is compatible with the designated approach procedure, allow user input selecting modification of the designated approach procedure with the A_GSA.

13. The system of claim 12, wherein the control module is further configured to:

subsequent to allowing modification of the designated approach procedure with the A_GSA, receive a user input selecting modification of the designated approach procedure with the A_GSA; and modify the designated approach procedure with the A_GSA.

14. The system of claim 11, wherein the control module is configured to determine that the A_GSA is not compatible with the designated approach procedure based on determining that employing the A_GSA violates a final approach segment altitude constraint.

15. The [method] *system* of claim 14, wherein the data from the on-board sensor system comprises an aircraft position and location, and wherein the control module is further configured to determine that the A_GSA is not compatible with the designated approach procedure based on determining that the aircraft position and location violates a predetermined distance from a landing threshold.

16. The [method] *system* of claim 15, wherein the data from the on-board sensor system further comprises an aircraft ground speed, and wherein the control module is further configured to determine that the A_GSA is not compatible with the designated approach procedure based on determining that an amount of time before landing based is less than a predetermined amount of time before landing.

17. The system of claim 16, wherein the control module is further configured to:

command the display device to render, a fourth icon indicating whether or not an adaptive interactive glide slope angle (AIGSA) system is activated;

a fifth icon indicating an approach type;

a sixth icon indicating the final approach segment altitude constraint; and a seventh icon indicating whether or not the AIGSA system is activated.

18. A method for an approach procedure for an aircraft, the method comprising:

at a control module:

receiving, from a user input device, a user designated approach procedure, altitude constraints, and landing parameters;

retrieving, from a navigation database (NDB), the designated approach procedure;

identifying a designated glide slope angle (D_GSA) based on the designated approach procedure;

receiving sensed weather data and sensed aircraft status data from an on-board sensor system;

determining an adaptive glide slope angle (A_GSA) based the sensed weather data and the sensed aircraft status data;

processing the A_GSA with the designated approach procedure to determine whether or not the A_GSA is compatible with the designated approach procedure; and commanding a display device to render a user interface comprising a plurality of icons, the plurality of icons comprising, a first icon indicating the D_GSA, a second icon indicating the A_GSA, and a third icon indicating whether or not the A_GSA is compatible with the designated approach procedure.

19. The method of claim 18, further comprising:

upon determining that the A_GSA is compatible with the designated approach procedure, allowing modification of the designated approach procedure with the A_GSA; and subsequent to allowing modification of the designated approach procedure with the A_GSA, receiving a user input selecting modification of the designated approach procedure with the A_GSA; and modifying the designated approach procedure with the A_GSA.

20. The method of claim 19, further comprising, upon determining that the A_GSA is not compatible with the designated approach procedure, generating a first alert and preventing modification of the designated approach procedure with the A_GSA.

*21. A method in an onboard system of an aircraft, the method comprising:*

*retrieving, from a navigation database (NDB), a user selected designated approach procedure for the aircraft;*

*identifying a designated glide slope angle (D_GSA) based on the designated approach procedure;*

*receiving sensed data from an on-board sensor system;*

*identifying an adaptive glide slope angle (A_GSA) based on the sensed data;*

*processing the A_GSA with the designated approach procedure to determine whether or not the A_GSA is compatible with the designated approach procedure; and*

*commanding a display device in the aircraft to render a user interface comprising a plurality of icons, the plurality of icons comprising:*

*a first icon indicating the D_GSA,*

*a second icon indicating the A_GSA, and*

*a third icon indicating whether or not the A_GSA is compatible with the designated approach procedure.*

*22. The method of claim 21, further comprising:*

*barring modification of the designated approach procedure with the A_GSA, when the A_GSA is not compatible with the designated approach procedure, and*

*allowing modification of the designated approach procedure with the A_GSA when the A_GSA is compatible with the designated approach procedure.*

*23. The method of claim 21, wherein determining whether or not the A_GSA is compatible with the designated approach procedure comprises determining whether or not employing the A_GSA violates a final approach segment altitude constraint.*

*24. The method of claim 21, wherein determining whether or not the A_GSA is compatible with the designated approach procedure comprises determining whether or not employing the A_GSA, based on an aircraft position and location received from the on-board sensor system, violates a predetermined distance from a landing threshold constraint.*

*25. The method of claim 21, wherein determining whether or not the A_GSA is compatible with the designated approach procedure comprises determining whether or not employing the A_GSA, based on an aircraft position, location, and ground speed received from the on-board sensor system, violates a predetermined amount of time before landing constraint.*

*26. Non-transitory computer readable media encoded with programming instructions configurable to cause a processor on an aircraft to perform a method, the method comprising:*

*retrieving, from a navigation database (NDB), a user selected designated approach procedure for the aircraft;*

*identifying a designated glide slope angle (D_GSA) based on the designated approach procedure;*

*receiving sensed data from a sensor system on-board the aircraft;*

*identifying an adaptive glide slope angle (A_GSA) based on the sensed data;*

*processing the A_GSA with the designated approach procedure to determine whether or not the A_GSA is compatible with the designated approach procedure; and*

*commanding a display device in the aircraft to render a user interface comprising a plurality of icons, the plurality of icons comprising:*

*a first icon indicating the D_GSA,*

*a second icon indicating the A_GSA, and*

*a third icon indicating whether or not the A_GSA is compatible with the designated approach procedure.*

*27. The non-transitory computer readable media of claim 26, wherein the method further comprises:*

*barring modification of the designated approach procedure with the A_GSA, when the A_GSA is not compatible with the designated approach procedure, and*

*allowing modification of the designated approach procedure with the A_GSA when the A_GSA is compatible with the designated approach procedure.*

*28. The non-transitory computer readable media of claim 26, wherein determining whether or not the A_GSA is compatible with the designated approach procedure comprises determining whether or not employing the A_GSA violates a final approach segment altitude constraint.*

*29. The non-transitory computer readable media of claim 26, wherein determining whether or not the A_GSA is compatible with the designated approach procedure comprises determining whether or not employing the A_GSA, based on an aircraft position and location received from the on-board sensor system, violates a predetermined distance from a landing threshold constraint.*

*30. The non-transitory computer readable media of claim 26, wherein determining whether or not the A_GSA is compatible with the designated approach procedure comprises determining whether or not employing the A_GSA, based on an aircraft position, location, and ground speed*

*received from the on-board sensor system, violates a predetermined amount of time before landing constraint.*

*31. A controller in an onboard aircraft system configured by programming instructions on non-transitory computer readable media, the controller configured to:*

*retrieve, from a navigation database (NDB), a user selected designated approach procedure for the aircraft;*

*identify a designated glide slope angle (D_GSA) based on the designated approach procedure;*

*receive sensed data from a sensor system on-board the aircraft;*

*identify an adaptive glide slope angle (A_GSA) based on the sensed data;*

*process the A_GSA with the designated approach procedure to determine whether or not the A_GSA is compatible with the designated approach procedure; and*

*command a display device in the aircraft to render a user interface comprising a plurality of icons, the plurality of icons comprising:*

*a first icon indicating the D_GSA,*

*a second icon indicating the A_GSA, and*

*a third icon indicating whether or not the A_GSA is compatible with the designated approach procedure.*

*32. The controller of claim 31, further configured to:*

*bar modification of the designated approach procedure with the A_GSA, when the A_GSA is not compatible with the designated approach procedure, and*

*allow modification of the designated approach procedure with the A_GSA when the A_GSA is compatible with the designated approach procedure.*

*33. The controller of claim 31, wherein to determine whether or not the A_GSA is compatible with the designated approach procedure the controller is configure to determine whether or not employing the A_GSA violates a final approach segment altitude constraint.*

*34. The controller of claim 31, wherein to determine whether or not the A_GSA is compatible with the designated approach procedure the controller is configure to determine whether or not employing the A_GSA, based on an aircraft position and location received from the on-board sensor system, violates a predetermined distance from a landing threshold constraint.*

*35. The controller of claim 31, wherein to determine whether or not the A_GSA is compatible with the designated approach procedure the controller is configure to determine whether or not employing the A_GSA, based on an aircraft position, location, and ground speed received from the on-board sensor system, violates a predetermined amount of time before landing constraint.*

* * * * *